US007673212B2

(12) United States Patent
Ji (10) Patent No.: US 7,673,212 B2
(45) Date of Patent: Mar. 2, 2010

(54) POWER CONTROL DEVICE AND METHOD FOR SATELLITE DMB RECEIVER

(75) Inventor: Salk Mann Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 1047 days.

(21) Appl. No.: 11/027,546

(22) Filed: Dec. 29, 2004

(65) Prior Publication Data
US 2005/0160343 A1 Jul. 21, 2005

(30) Foreign Application Priority Data
Dec. 29, 2003 (KR) .................. 10-2003-0098963

(51) Int. Cl.
*H03M 13/00* (2006.01)
(52) U.S. Cl. .................. 714/752; 725/131; 725/69
(58) Field of Classification Search ............ 714/752; 455/343.1, 342.2, 556.1; 725/131, 68, 69
See application file for complete search history.

(56) References Cited

U.S. PATENT DOCUMENTS 7,236,213 B2 * 6/2007 Hoshino .............. 348/730

2003/0056221 A1 * 3/2003 Zhang et al. ............ 725/70
2003/0115588 A1 * 6/2003 Hoshino .................. 725/9

* cited by examiner

Primary Examiner—Sam Rizk
(74) Attorney, Agent, or Firm—Lee, Hong, Degerman, Kang & Waimey (57) ABSTRACT

A power control device and method capable of reducing the power consumption of a DMB receiver according to whether or not CDM channels are received is provided. The power control device includes N CDM/FEC parts for demodulating a received broadcast signal into up to N CDM channel signals and error-correcting the demodulated channel signals and thereby generating a pilot payload signal and a transport stream, a plurality of clock switches for respectively turning on/off clock signals supplied to the N CDM/FEC parts, and a clock switch controller for controlling turning on/off of the clock switches, and controls supply of clock signals to the CDM/FEC parts according to CDM channel reception states, thereby making it possible to reduce the power consumption by the CDM/FEC parts.

19 Claims, 6 Drawing Sheets

| CLOCK SWITCH | M1 | M2 | M3 | M4 | M5 | M6 | M7 | M8 | M9 | M10 |
|---|---|---|---|---|---|---|---|---|---|---|
| S1 | On | On | On | On | On | On | On | On | On | On |
| S2 | On | On | On | On | On | On | On | On | On | On |
| S3 | Off | Off | On | On | Off | Off | On | On | Off | Off |
| S4 | Off | Off | On | On | Off | Off | On | On | Off | Off |
| S5 | Off | On | Off | On | Off | On | Off | On | Off | On |
| S6 | Off | On | Off | On | Off | On | Off | On | Off | On |
| S7 | Off | Off | On | On | On | On | On | On | On | On |
| S8 | Off | Off | On | On | On | On | On | On | On | On |
| S9 | Off | Off | On | On | On | On | Off | Off | Off | Off |
| S10 | Off | Off | On | On | On | On | Off | Off | Off | Off |

POWER CONTROL DEVICE AND METHOD FOR SATELLITE DMB RECEIVER

CROSS-REFERENCE TO RELATED APPLICATIONS

Pursuant to 35 U.S.C. § 119(a), this application claims the benefit of earlier filing date and right of priority to Korean Application No. 98963/2003, filed on Dec. 29, 2003, the contents of which are hereby incorporated by reference herein in their entirety.

BACKGROUND OF THE INVENTION

1. Field of the Invention

The present invention relates to a satellite multimedia broadcasting (DMB) receiver, and more particularly, to a power control device and method for a satellite DMB receiver, which can reduce power consumption by controlling power according to a reception state of a code division multiplexing (CDM) channel.

2. Description of the Related Art

Recently, standardization and commercialization of a digital audio broadcast is being globally promoted. Europe adopts Eureka-147 as a digital audio broadcast standard and uses a digital audio broadcasting (DAB) system, America uses a digital audio radio (DAR) system, Canada uses a digital radio broadcasting (DRB) system, the international telecommunication union-radio communication sector (ITU-R) uses a digital sound broadcasting (DSB) system, and Korea adopts and uses a digital multimedia broadcasting (DMB) system.

The DAB system has been developed as the next-generation broadcasting system. The DAB system is robust against radio environments and noises in the downtown, and thus makes it possible to receive CD-quality audio signals in a vehicle driving at a high speed although broadcasting signals are transmitted at low output power. Also, the DAB system has expanded the existing audio radio broadcasting concept into an audio/video radio broadcasting concept, and makes it possible to transmit various multimedia information such as news, traffic information, weather information, geographic position information and motion picture information by character and graphic, in addition to a music broadcast.

In the meantime, the DMB system also has been developed as the next-generation broadcasting system. With digitalization of audio broadcasting, the DMB system exceeds the existing AM/FM radio broadcasting system and makes it possible to transmit CD-quality audio signals, characters or graphics and motion pictures at 1.5 Mbit/s, thereby enabling various data services, a bidirectional broadcasting service and a superior mobile reception quality.

The DMB service can be broadly divided into a terrestrial DMB service and a satellite DMB service according to its transmission medium types, and the satellite DMB service can be subdivided into a stationary satellite. DMB service and a mobile satellite DMB service.

The European broadcasting union (EBU) and the ITU-R have recommended the required characteristics of the DMB system as follows:

1. The DMB system should be realized by a digital transmission scheme guaranteeing a high broadcast quality, should be continuously acceptable during the next 50 years, and should provide a high-quality sound of 2 or more channels.

2. The DMB system should make it possible to errorlessly receive a broadcast signal also by a portable terminal in a driving vehicle. That is, the DMB system should enables mobile reception, portable reception and stationary reception.

3. The DMB system should make it possible to provide a PAD (program associated data) channel service for transmitting additional data by a normal broadcast program and a Non-PAD channel service for an independent broadcast program. Accordingly, the DMB system should be able to recognize radio signal data, character data and program data.

4. The DMB system should be high in its transmission capacity and efficiency so as to be able to accommodate various data channel capacities and to increase frequency usage efficiency.

A DMB receiver for the DMB system is also being commercialized. For example, a DMB receiver built in a portable terminal, such as a personal digital assistant (PDA), or a vehicle terminal has been already launched.

In the meantime, a satellite DMB system receives a high-quality sound, various data information (such as traffic information, weather information and game information) and a motion picture (such as a movie and a sports program) from a satellite and then transmits the same to a mobile terminal and a vehicle receiver over a frequency band of 1400 through 2700 MHz.

Such a DMB system transmits one broadcast program on N CDM channels, and each CDM channel is divided into a pilot channel, a program specific information (PSI) channel, a system information (SI) channel and a video/audio channel, and so on.

Accordingly, so as to receive one broadcast program, the satellite DMB receiver is constructed to include N CDM parts and N forward error correction (FEC) parts for receiving the respective N CDM channels.

That is, since one CDM channel is constructed by combination of one CDM part and one FEC part, the satellite DMB receiver should be constructed by N CDM parts and N FEC parts for receiving the respective CDM channels.

Here, the CDM part demodulates a signal outputted from a tuner into a CDM signal, and the FEC part error-corrects the CDM demodulation signal to then generate a pilot payload signal or an MPEG-2 transport bitstream from the CDM demodulation signal according to respective channel characteristics.

Thereafter, the generated MPEG-2 transport bitstream is decoded, whereby a user can view a desired broadcast program.

The so-constructed and operated satellite DMB receiver should simultaneously receive N CDM channels so as to receive one broadcast program, and thus drives all the N CDM parts and al the N FEC parts to thereby consume high power. Accordingly, there is a restriction in a battery usable time of the satellite DMB receiver, whereby the satellite DMB receiver's usable time is undesirably reduced.

SUMMARY OF THE INVENTION

Accordingly, the present invention is directed to a power control device and method for a satellite DMB receiver, which substantially obviates one or more problems due to limitations and disadvantages of the related art.

An object of the present invention is to provide a power control device and method for a satellite DMB receiver, which controls supply of clocks to CDM/FEC parts according to whether or not a CDM channel is being received, thereby making it possible to reduce an unnecessary power consumption of the CDM/FEC parts.

Another object of the present invention is to provide a power control device for a satellite DMB receiver, which includes 2N switches turned on/off for controlling clocks supplied to N CDM parts and N FEC parts, thereby making it possible to turn on/off the 2N switches according to whether or not a CDM channel is being received.

A further object of the present invention is to provide a power control device for a satellite DMB receiver, which includes N switches turned on/off for controlling clocks supplied to respective N CDM/FEC parts, thereby making it possible to turn on/off the N switches according to whether or not a CDM channel is being received.

A further another object of the present invention is to provide a power control method for a satellite DMB receiver, which analyzes whether or not CDM/FEC parts are being operated, based on a decoded CDM channel during the broadcast reception, thereby making it possible to control supply of clocks to the CDM/REC parts.

A still another object of the present invention is to provide a power control method for a satellite DMB receiver, which analyzes whether or not CDM/FEC parts are being operated, based on information about selected channels when a channel is selected or converted by a user during the broadcast reception, thereby making it possible to control supply of clocks to the CDM/REC parts.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power control device for a DMB receiver includes: N CDM/FEC parts for demodulating a received broadcast signal into up to N CDM channel signals and error-correcting the demodulated channel signals and thereby generating a pilot payload signal and a transport stream; a plurality of clock switches for respectively turning on/off clock signals supplied to the N CDM/FEC parts; a clock switch controller for controlling turning on/off of the clock switches; and a CPU for controlling the clock switch controller-so that the N CDM/FEC parts are operated to interface with CDM channels of the received broadcast program and a broadcast channel selected by a user.

In a further another aspect of the present invention, a power control method for a DMB receiver includes the steps of: receiving a broadcast signal when the DMB receiver is powered on; demodulating the received broadcast signal into CDM channel signals and error-correcting the demodulated CDM channel signals and thereby generating a pilot payload signal and a transport stream and then decoding the pilot payload signal and the transport stream; and turning off supply of clock signals to CDM/FEC parts not related to the CDM channels.

In another aspect of the present invention, a power control device for a DMB receiver, includes: a tuner for receives a broadcast signal; a modem part comprising N CDM/FEC parts for demodulating the received broadcast signal into up to N CDM channel signals and error-correcting the demodulated channel signals and thereby generating a pilot payload signal and a transport stream, and a multiplexer for multiplexing up to N CDM channels; a decoder for decoding the generated pilot payload signal and transport stream; a plurality of clock switches for respectively turning on/off clock signals supplied to the N CDM/FEC parts; and a clock switch controller for controlling operations of the N CDM/FEC parts by controlling the turning on/off of the clock switches.

Accordingly, the present invention selectively operates only necessary channels by using clock switches for controlling apply of clock signals to CDM/FEC parts assigned to respective channels, thereby making it possible to reduce the total power consumption of the DMB receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
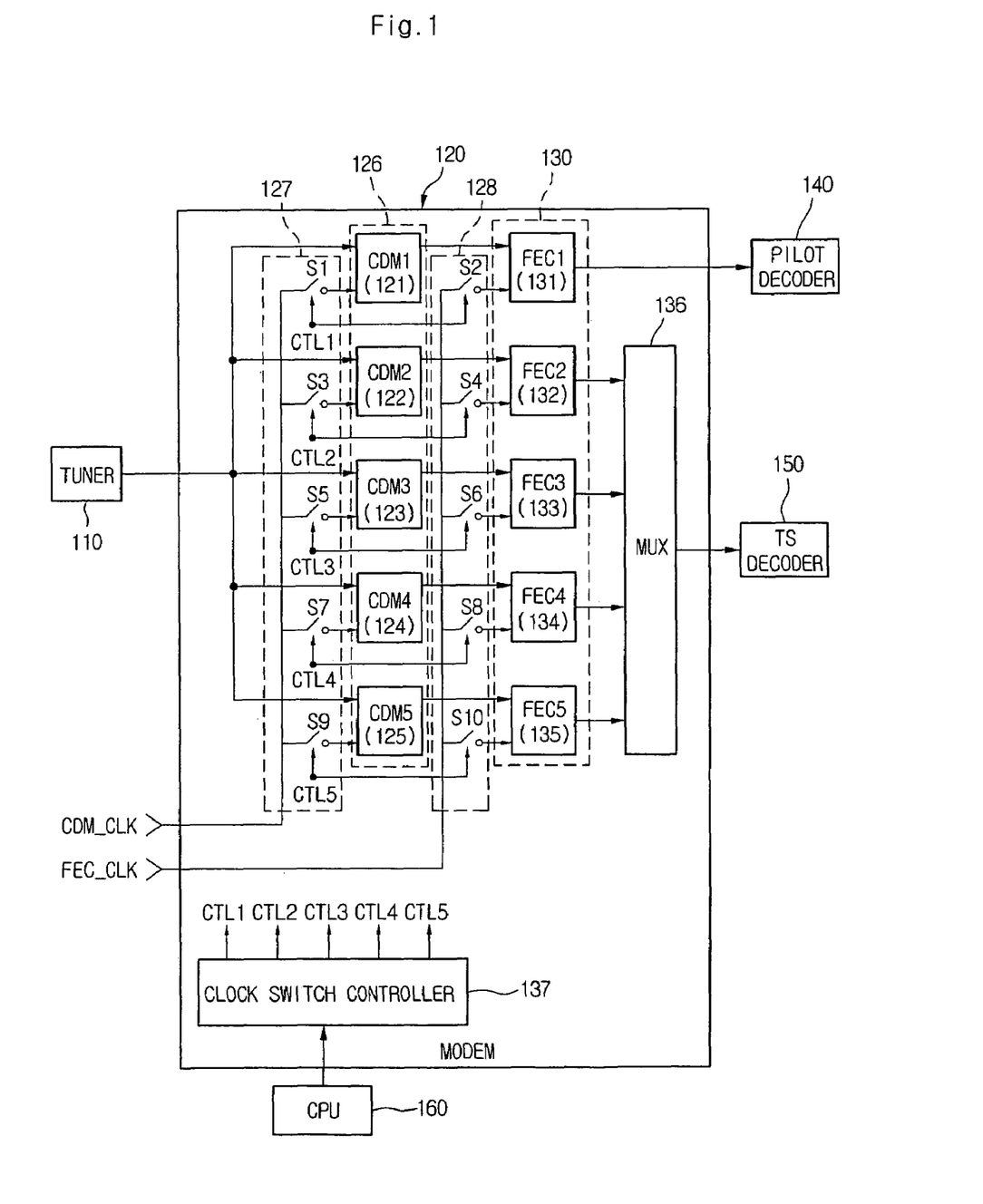
FIG. 1 is a block diagram of a power control device for a DMB receiver according to an embodiment of the present invention.

FIG. 1 is a block diagram of a power control device for a DMB receiver according to an embodiment of the present invention.

Referring to FIG. 1, the power control device is constructed to include a tuner 110 for receiving a broadcast signal, a modem part 120 for demodulating the received broadcast signal into up to N CDM channels and error-correcting the demodulated channel signals and thereby generating a pilot payload signal and a transport stream (TS), a pilot decoder 140 for decoding the pilot payload signal, a TS decoder 150 for decoding the transport stream, and a central processing unit (CPU) 160 for controlling a successive signal flow from the tuner 110 through the TS decoder 150 according to a channel selection by a user.

The modem part 120 is constructed to include a plurality of CDM parts (CDM1 through CDM5) 126 for respectively demodulating a plurality of channels contained in one broadcast program, a plurality of FEC parts (FEC1 through FEC 5) 130 for respectively error-correcting demodulated signals outputted from the CDM parts 126, switch parts 127 and 128 having a plurality of clock switches S1 through S10 for respectively turning on/off clock inputs to the CDM parts 126 and the FEC parts 130, a multiplexer (MUX) 136 for multiplexing CDM channel signals out of error-corrected signals outputted from the FEC parts 130, and a clock switch controller 137 for controlling the clock switches S1 through S10.

An operation of the above-constructed power control device will now be described in detail with reference to FIG. 1.

As shown in FIG. 1, when the DMB receiver receives a broadcast signal through the tuner 110, the modem part 120 generates and outputs a pilot payload signal and a TS (MPEG-2) by using the CDM parts 126 and the FEC parts 130. The pilot decoder 140 decodes a pilot signal, and the TS decoder 150 decodes a CDM channel multiplexed by the multiplexer 136 of the modem part 120. Accordingly, a user can view a broadcast program from the so-decoded TS.

At this time, since one program is multiplexed by N-numbered CDM channels and then transmitted, the CDM parts 126 and the FEC parts 130 are respectively constructed by N-numbered CDM parts and N-numbered FEC parts for respectively receiving the N-numbered CDM channels. That is, each pair of the CDM and FEC parts receives each corresponding channel of the N-numbered CDM channels.

In this DMB receiver, the CDM and FEC parts 126 and 130 should be constructed by minimally 5 pairs of CDM and FEC parts so as to be able to receive a broadcast. Although the CDM and FEC parts 126 and 130 can be constructed by 6 pairs of CDM and FEC parts, it is economically preferable that the CDM and FEC parts 126 and 130 are constructed by 5 pairs of CDM and FEC parts.

Also, the CDM channels for a broadcast service are constructed by 5 channels, for example, a pilot channel for synchronous demodulation in a receiver and for transmission of system control data, an electronic program guide (EPG) PSI/SI channel (hereinafter simply referred to as "EPG channel") for providing program guide information by using PSI/SI tables, a conditional access system (CAS) PSI/SI channel (hereinafter also referred to as "subscriber authentication channel") containing CAS information for identifying whether or not a subscriber has been authenticated, and video and audio channels for transmitting video and audio signals. Accordingly, the CDM and FEC parts 126 and 130 are constructed by 5 pairs of CDM and FEC parts 121 through 125 and 131 through 135 so as to receive the above 5 CDM channels.

Here, the subscriber authentication channel is necessary for identifying authentication or non-authentication of a subscriber so as to charge a fee for a pay service. Information about the authentication or non-authentication of a subscriber is transmitted over a broadcast channel in the shape of a table. For example, if a DMB broadcast is a pay service, all the programs should be authenticated, and a premium channel program such as an adult broadcast should be re-authenticated for identifying whether or not a premium service has been subscribed to. On the contrary, a free channel program which a broadcast station provides for promotion needs not to be authenticated.

Also, the DMB receiver displays channel information (EPG) received over a broadcast channel, and a subscriber (user) can select a desired broadcast by navigating the channel information. Such selection or non-selection of the broadcast program is determined by a user.

Theoretically, the CDM channels can be theoretically up to 64 numbered by a 64-bit Walsh code. However, since the orthogonalty of the Walsh code is decreased during the multipath reception, the CDM channels are multiplexed at a lower number in an actual commercialized system.

Also, although the multiplexed CDM channels are received, all the CDM parts 121 through 125 (CDM1 through CDM5) are not always used. That is, some of the CDM and FEC parts may remain in an actually-unused state (that is, a standby state), even when they receive clock signals (CDM_CLK, FEC_CLK). Accordingly, the present invention is contrived to cut off the supply of clock signals to such the CDM and FEC parts remaining in the standby state.

For this, the power control device includes the switch parts 127 and 128 having a plurality of clock switches S1 through S10, the clock switch controller 137 for controlling the clock switches S1 through S10, and the CPU 160 for outputting a control signal to the clock switch controller 137 according to a received DMB channel selection.

The switch parts 127 and 128 respectively include the clock switches S1, S3, S5, S7, S9 and the clock switches S2, s4, S6, S8, S10 respectively connected to clock supply lines of the CDM parts 121 through 125 and clock supply lines of the FEC parts 131 through 135. Depending on the turning on/off of the clock switches S1 through S10, only the CDM and FEC parts corresponding to channels containing actual information or channels selected by a user are operated, whereby the power consumption of the DMB receiver can be decreased.

Under the control of the CPU 160, the clock switch controller 137 outputs control signals CTL1 through CTL5 for controlling the clock switches S1 through S10 to thereby simultaneously control the supply of the clock signals CDM_CLK and FEC_CLK to the 5 pairs of the CDM and FEC parts.

At this time, the CPU 160 controls an overall operation of the DMB receiver. Particularly, the CPU 160 controls the clock switch controller 137 based on the Walsh code containing CDM channel information so that only channels containing actual information are selected. Accordingly, the supply of clocks to CDM/FEC parts to which a Walsh code is not assigned can be cut off.

Here, according to whether or not respective pairs of CDM/FEC parts 121/131 through 125/135 are being used, the clock switch controller 137 turns on/off respective pairs of clock switches S1/S2 through S9/S10 connected respectively to the respective pairs of CDM/FEC parts 121/131 through 125/135 by using only one control signal. That is, the clock switch controllers 137 outputs only 5 control signals for controlling the 5 pairs of CDM/FEC parts 121/131 through 125/135.

Also, the same CDM clock signal (CDM_CLK) is supplied to the 5 CDM parts 121 through 125, and the same FEC clock signal (CDM_CLK) is supplied to the 5 FEC parts 131 through 135. Here, the CDM clock signal and the FEC clock signal may be identical to or different from each other according to system designs. In case where the CDM clock signal and the FEC clock signal are different from each other, the number of the clock switches may be varied differently from the above-stated number.

Specifically, the first and second clock switches S1 and S2 are turned on/off by the first control signal CTL1 of the clock switch controller 137 whereby the supply of clock signals CDM_CLK and FEC_CLK to the first CDM and FEC parts 121 and 131 is controlled, the third and fourth clock switches S3 and S4 are turned on/off by the second control signal CTL2 whereby the supply of the clock signals to the second CDM and FEC parts 122 and 132 is controlled, the fifth and sixth clock switches S5 and S6 are turned on/off by the third control signal CTL3 whereby the supply of the clock signals to the third CDM and FEC parts 123 and 133 is controlled, the seventh and eighth clock switches S7 and S8 are turned on/off by the fourth control signal CTL4 whereby the supply of the clock signals to the fourth CDM and FEC parts 124 and 134 is controlled, and the ninth and tenth clock switches S9 and S10 are turned on/off by the fifth control signal CTL5 whereby the supply of the clock signals to the fifth CDM and FEC parts 125 and 135 is controlled. Accordingly, a pair of CDM and FEC parts failed to receive clock signals due to the turning off of their clock switches are turned off.

Here, the total power consumption of the modem part 120 can be expressed as [5×(P_CDM+P_FEC)+P_CLK] where "P_CDM" is the power consumption of the CDM part 126, "P_FEC" is the power consumption of the FEC part 130, and "P_CLK is the power consumption of the switch part 127 and 128 and the clock switch controller 137. At this time, the P_CLK is negligibly and considerably small in comparison to the P_CDM and the P_FEC, and the clock switch controller 137 may be installed at the outside of the modem part 120, if necessary.

Accordingly, if the P_CDM and the P_FEC are reduced, the total power consumption of the DMB receiver can be considerably reduced.

The power consumption of respective CDM channels of the DMB receiver will now be describe. For convenience in description, it is assumed that a pilot channel is assigned to the first CDM/FEC parts 121/131, a subscriber authentication channel is assigned to the second CDM/FEC parts 122/132, a EPG channel is assigned to the third CDM/FEC parts 123/133, a video channel is assigned to the fourth CDM/FEC parts 124/134, and an audio channel is assigned to the fifth CDM/FEC parts 125/135.

If a broadcast prom is not being received by the DMB receiver, the clock switch controller 137 makes only the first and second switches S1 and S2 turned on but makes the remaining clock switches S3 through S10 turned off for only the pilot channel should be received. Otherwise, if a broadcast prom is being received by the DMB receiver, the clock switch controller 137 makes the first and second switches S1 and S2 and necessary ones out of the remaining switches S3 through S10 turned on for the pilot channel should be always received during the reception of a broadcast program.

Here, the pilot channel should be always received during the broadcast reception and during the channel selection and conversion, but should not be always received during the viewing of a broadcast program.

If CAS information for subscriber authentication is selected, the clock switch controller 137 makes the third and fourth switches S3 and S4 for receiving the subscriber authentication channel (PSI/SI) turned on. However, if the subscriber authentication is unnecessary, the clock switch controller 137 makes the third and fourth switches S3 and S4 turned off.

Here, if a broadcast channel selected by a user is a pay service channel, the subscriber authentication is performed for charging a fee. At this time, information about whether or not the subscriber authentication is necessary is contained in the broadcast channel to then be transmitted in the form of a table, and the DMB receiver receives and reads the information to then display the read results or inform the user of the read results, thereby enabling the user to select the pay service.

The user then selects whether or not a program selection is necessary through the EPG channel. At this time, the fifth and sixth clock switches S5 and S6 are turned on so as to turn on the third CDM/FEC parts 123/133 for receiving the EPG channel. However, if the program selection is unnecessary, the fifth and sixth clock switches S5 and S6 are turned off so as to turn off the third CDM/FEC parts 123/133.

In case where a video program is being received, the seventh through tenth clock switches S7 through S10 are turned on so as to turn on the fourth and fifth CDM/FEC parts 124/134 and 125/135 for respectively receiving video and audio channels.

In case where only an audio program not a video program is being received, the seventh and eighth clock switches S7 and S8 of the fourth CDM/FEC parts 124/134 for receiving an audio channel are turned on, and the ninth and tenth clock switches S9 and S10 are turned off. Also, if video and audio programs are not received, the second through tenth clock switches S7 through S10 are turned off.

Figure 2:
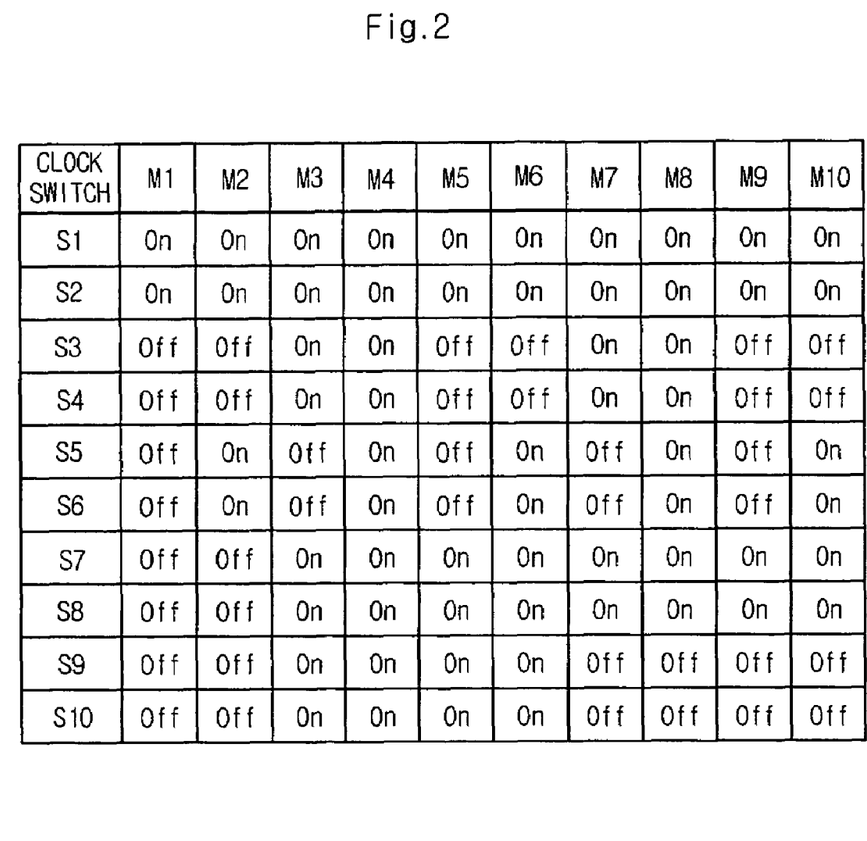
FIG. 2 is a table illustrating on/off states according to operation modes of a CDM channel according to an embodiment of the present invention.

FIG. 2 is an exemplary table illustrating on/off states of the clock switches S1 through S10 according to power control modes M1 through M10 in the DMB receiver shown in FIG. 1.

Referring to FIG. 2, in case of a first power control mode M1 where only a pilot channel is received, the first and second clock switches S1 and S2 are turned on so as to operate only the first CDM/FEC parts 121/131, and the reaming clock switches S3 through S10 are turned off. At this time, the power consumption of the modem part 120 is [1×(P_CDM+P_FEC)+P_CLK] whereby about 4/5 power consumption can be saved in comparison to the prior art.

In case of a second power control mode M2 where an EPG channel for channel selection is received, the clock switches S1, S2, S5 and S6 are turned on so as to operate on the first and third CDM/FEC parts 121/131 and 123/133, and the reaming clock switches S3, S4 and S7 through S10 are turned off. At this time, the power consumption of the modem part 120 is [2×(P_CDM+P_FEC)+P_CLK] whereby about 3/5 power consumption can be saved in comparison to the prior art.

In case of a third power control mode M3 where a video program requiring the subscriber authentication is received, the clock switches S1 through S4 and S7 through S10 are turned on so as to operate on the first, second, fourth and fifth CDM/FEC parts 121/131, 122/132, 124/134 and 125/135, and the reaming clock switches S5 and S6 are turned off. At this time, the power consumption of the modem part 120 is [4×(P_CDM+P_FEC)+P_CLK] whereby about 1/5 power consumption can be saved in comparison to the prior art.

In case of a fourth power control mode M4 where an EPG channel and a video program requiring the subscriber authentication are received, all the clock switches S1 through S10 are turned on so as to operate on the first through fifth CDM/FEC parts 121/131 through 125/135. At this time, the power consumption of the modem part 120 is [5×(P_CDM+P_FEC)+P_CLK].

In case of a fifth power control mode M5 where a video program not requiring the subscriber authentication is received, only the clock switches S1, S2 and S7 through S10 are turned on so as to operate on the first, fourth and fifth CDM/FEC parts 121/131, 124/134 and 125/135, and the reaming clock switches S3 through S6 are turned off. At this time, the power consumption of the modem part 120 is [3×(P_CDM+P_FEC)+P_CLK] whereby about 2/5 power consumption can be saved in comparison to the prior art.

In case of a sixth power control mode M6 where an EPG channel and a video program not requiring the subscriber authentication are received, the clock switches S1, S2 and S5 through S10 are turned on so as to operate on the first, third, fourth and fifth CDM/FEC parts 121/131, 123/133, 124/134 and 125/135, and the reaming clock switches S3 and S4 are turned off. At this time, the power consumption of the modem part 120 is [4×(P_CDM+P_FEC)+P_CLK] whereby about 4/5 power consumption can be saved in comparison to the prior art.

In case of a seventh power control mode M7 where an audio program requiring the subscriber authentication is received, the clock switches S1 through S4, S7 and S8 are turned on so as to operate on the first, second and fourth CDM/FEC parts 121/131, 122/132 and 124/134, and the reaming clock switches S5, S6, S9 and S10 are turned off. At this time, the power consumption of the modem part 120 is [3×(P_CDM+P_FEC)+P_CLK] about ⅖ power consumption can be saved in comparison to the prior art.

In case of an eighth power control mode M8 where an EPG channel and an audio program requiring the subscriber authentication are received, the clock switches S5 and S6 of the third CDM/FEC parts 123/133 are additionally turned on in comparison to the seventh power control mode M7. At this time, the power consumption of the modem part 120 is [4×(P_CDM+P_FEC)+P_CLK] whereby about ⅕ power consumption can be saved in comparison to the prior art.

In case of a ninth power control mode M9 where an audio program not requiring the subscriber authentication is received, the clock switches S3 and S4 of the second CDM/FEC parts 122/132 are turned off in comparison to the eighth power control mode M8. At this time, the power consumption of the modem part 120 is [3×(P_CDM+P_FEC)+P_CLK] whereby about ⅖ power consumption can be saved in comparison to the prior art.

In case of a tenth power control mode M10 where an EPG channel and audio program not requiring the subscriber authentication are received, the clock switches S5 and S6 of the third CDM/FEC parts 123/133 are additionally turned on in comparison to the eighth power control mode M8. At this time, the power consumption of the modem part 120 is [3×(P_CDM+P_FEC)+P_CLK] whereby about ⅖ power consumption can be saved in comparison to the prior art.

Although the on/off states of the clock switches S1 through S10 according to the power control modes depending on whether or not the CDM and FEC parts 126 and 130 receive CDM channels have been described previously, the power control modes can be mutually converted into one another by selection and conversion of broadcast channels, and clock supply states can be maintained or varied according to the conversion states of the power control modes. Also, the supply of a clock signal to a CDM/FEC part converted from a operation state into a standby state is cut off, and on the contrary the supply of a clock signal to a CDM/FEC part converted from a standby state into a operation state is newly activated. In this manner, clock signals are not supplied to CDM/FEC parts whereby the power consumption of the DMB receiver can be efficiently reduced.

Figure 3:
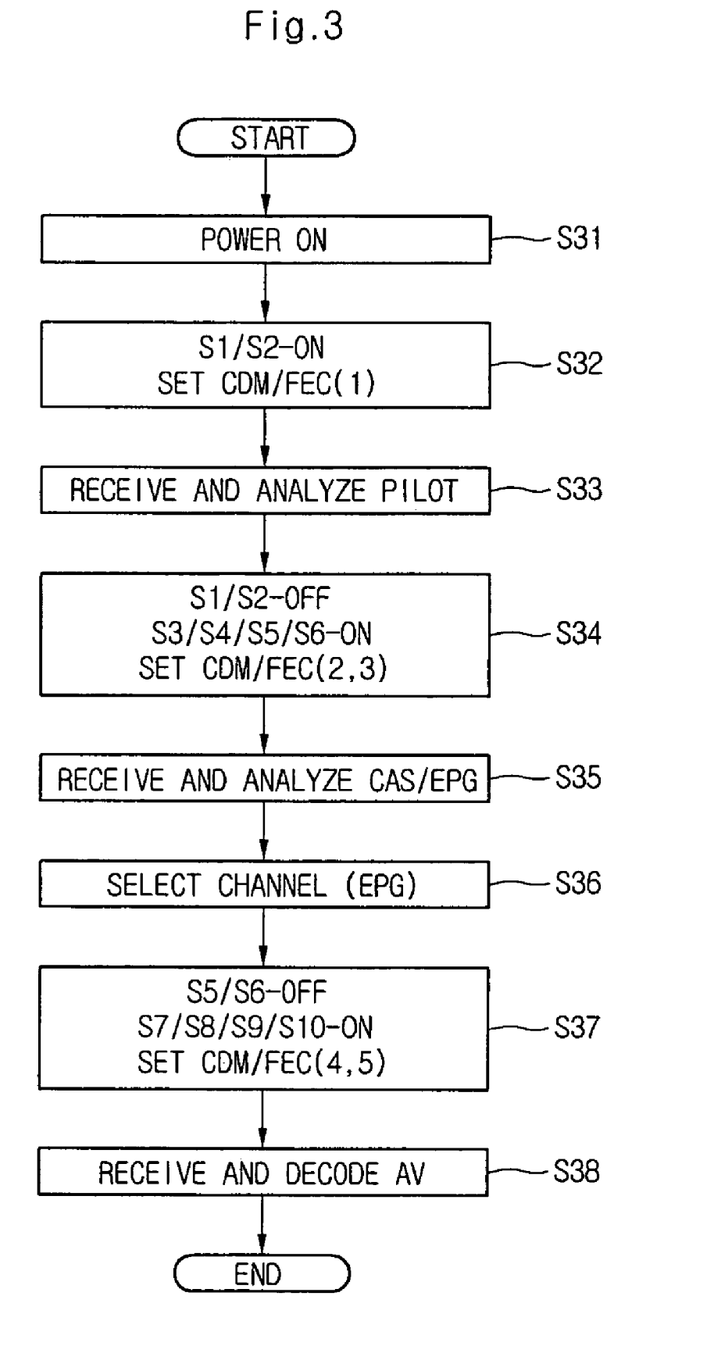
FIG. 3 is a flow diagram illustrating a power control method in the DMB receiver shown in FIG. 1.

FIG. 3 is a flow diagram illustrating a power control method in the DMB receiver shown in FIG. 1.

Referring to FIG. 3, when powered on (S31), the DMB receiver supplies clock signals to the first CDM/FEC part 121/131 by turning on the first and second clock switches S1 and S2 to thereby receive a pilot channel signal (S32). The DMB receiver analyzes the received pilot channel signal (S33).

Thereafter, the DMB receiver turns off the first and second clock switches S1 and S2, turns on the third through sixth clock switches S3 through S6 to thereby supply clock signals to the second and third CDM/FEC parts 122/132 and 123/133 (S34). The DMB receiver then receives and analyzes a CAS channel signal and an EPG channel signal (S35).

At this time, when a broadcast channel is selected by a user (S36), the DMB receiver turns off the fifth and sixth clock switches S5 and S6, and supplies clock signals to the fourth and fifth CDM/FEC parts 124/134 and 125/135 (S37) by turning on the seventh through tenth clock switches S7 through S10 to thereby perform AV reception and decoding (S38).

Here, when the broadcast channel is changed by the user, steps S32 through S38 are repeated.

Figure 4:
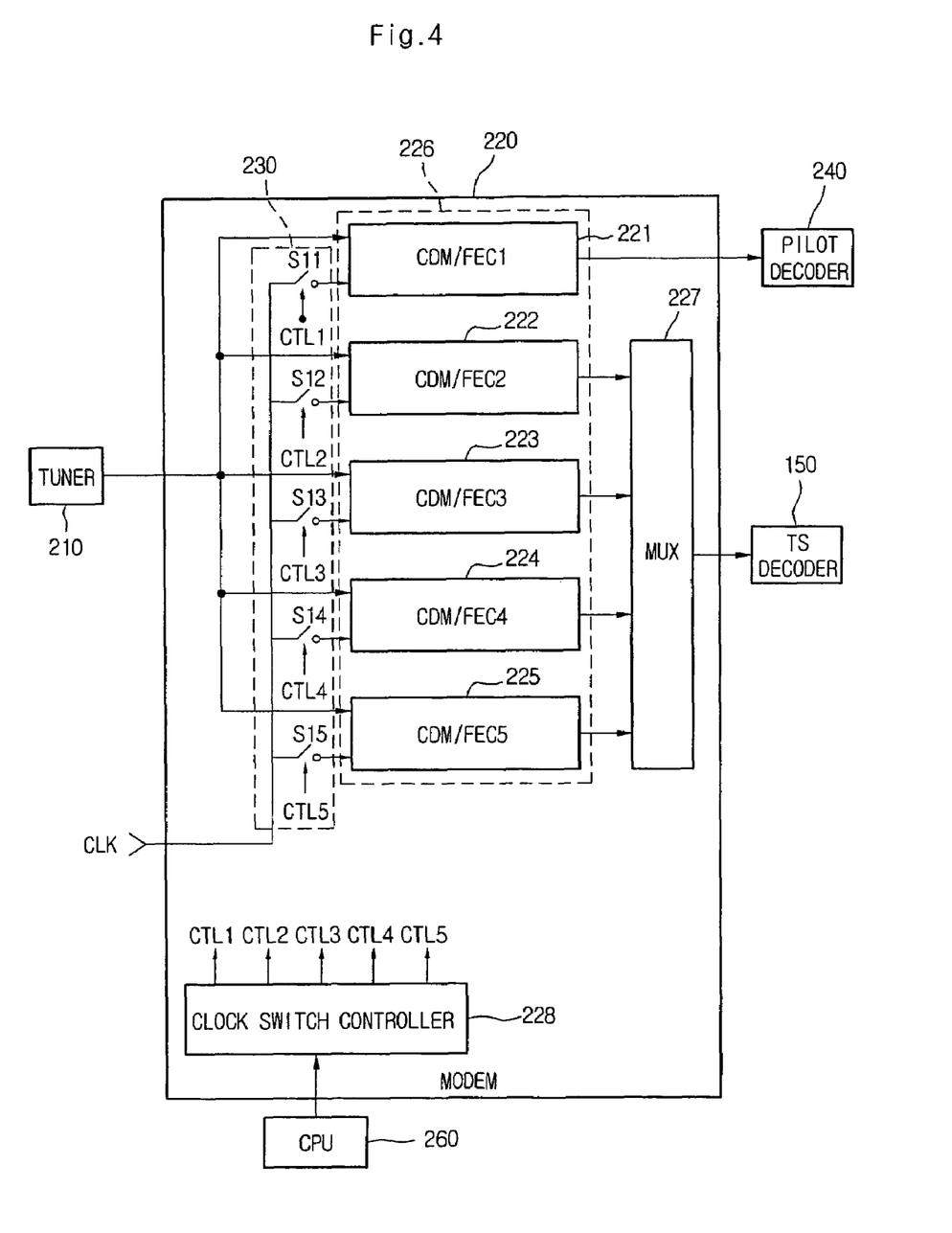
FIG. 4 is a block diagram of a power control device for a DMB receiver according to another embodiment of the present invention.

FIG. 4 is a block diagram of a power control device for a DMB receiver according to another embodiment of the present invention.

Referring to FIG. 4, if the same clock signal (CLK) is applied to minimally 5 pairs of CDM/FEC parts (226: 221, through 225), a modem part 220 is constructed to include 5 clock switches S11 through S15. Otherwise, even if different clock signals are applied to the 5 pairs of CDM/FEC parts (226: 221 through 225), the modem part 220 can be constructed by 5 clock switches so as to simultaneously control the apply of the different clock signals to the CDM/FEC parts 221 through 225.

Accordingly, a CPU 260 outputs a control signal to a clock switch controller 228 based on a Walsh code containing CDM channel information so as to control the supply of a clock signal to the CDM/FEC parts 221 through 225. In response to the control signal, the clock switch controller 228 outputs clock control signals CTL1 through CTL5 for controlling the clock switches S11 through S15, whereby the supply of the clock signal to the CDM/FEC parts 221 through 225 are turned on or off.

That is, after necessary ones of CDM/FEC parts 221 through 225 are determined according to broadcast program reception or channel selection, if a currently-operated CDM/FEC part is necessary, the CPU 260 maintains an operation state of the currently-operated CDM/FEC part. Otherwise, if the currently-operated CDM/FEC part is unnecessary, the CPU 260 cuts off supply of a clock signal to the currently-operated CDM/FEC part. Also, if another CDM/FEC part needs to be operated, the CPU 260 supplies a clock signal to the another CDM/FEC part.

Figure 5:
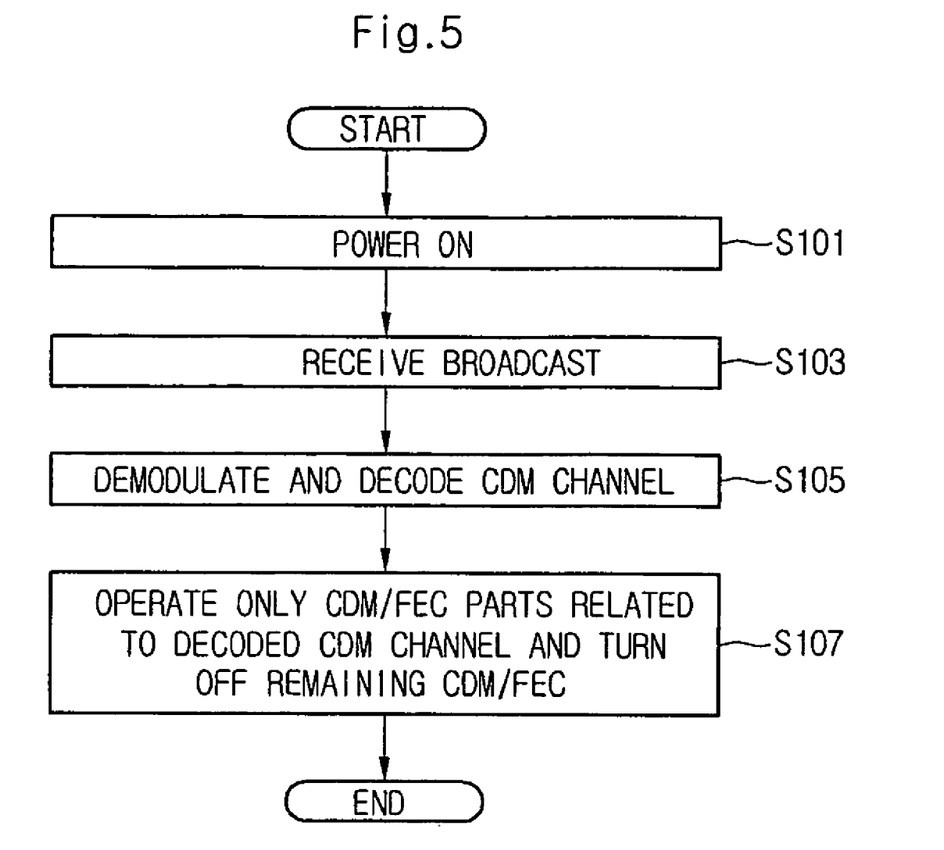
FIG. 5 is a flow diagram illustrating a power control method for a DMB receiver according to an embodiment of the present invention.

FIG. 5 is a flow diagram illustrating a power control method for a DMB receiver according to an embodiment of the present invention.

Referring to FIG. 5, when powered on (S101), the DMB receiver receives a broadcast signal of a previously-selected broadcast channel (S103). At this time, the DMB receiver demodulates and decodes respective CDM channels from the received broadcast signal (S105). At this time, the DMB receiver supplies a clock signal to a CDM/FEC part related to the decoded CDM channel (that is, a CDM/FEC part to which a Walsh code is assigned), or maintains the supply of a clock signal to the CDM/FEC part. That is, if all the CDM/FEC parts are initially turned on in a default mode, the DMB receiver maintains the clock supply, and if new CDM channels should be added, the DMB receiver starts to supply a clock signal to the new CDM channels.

Thereafter, the DMB receiver turns off clock switches of the remaining CDM/FEC parts not related to the decoded CDM channel to thereby turn off the remaining CDM/FEC parts (S107).

Figure 6:
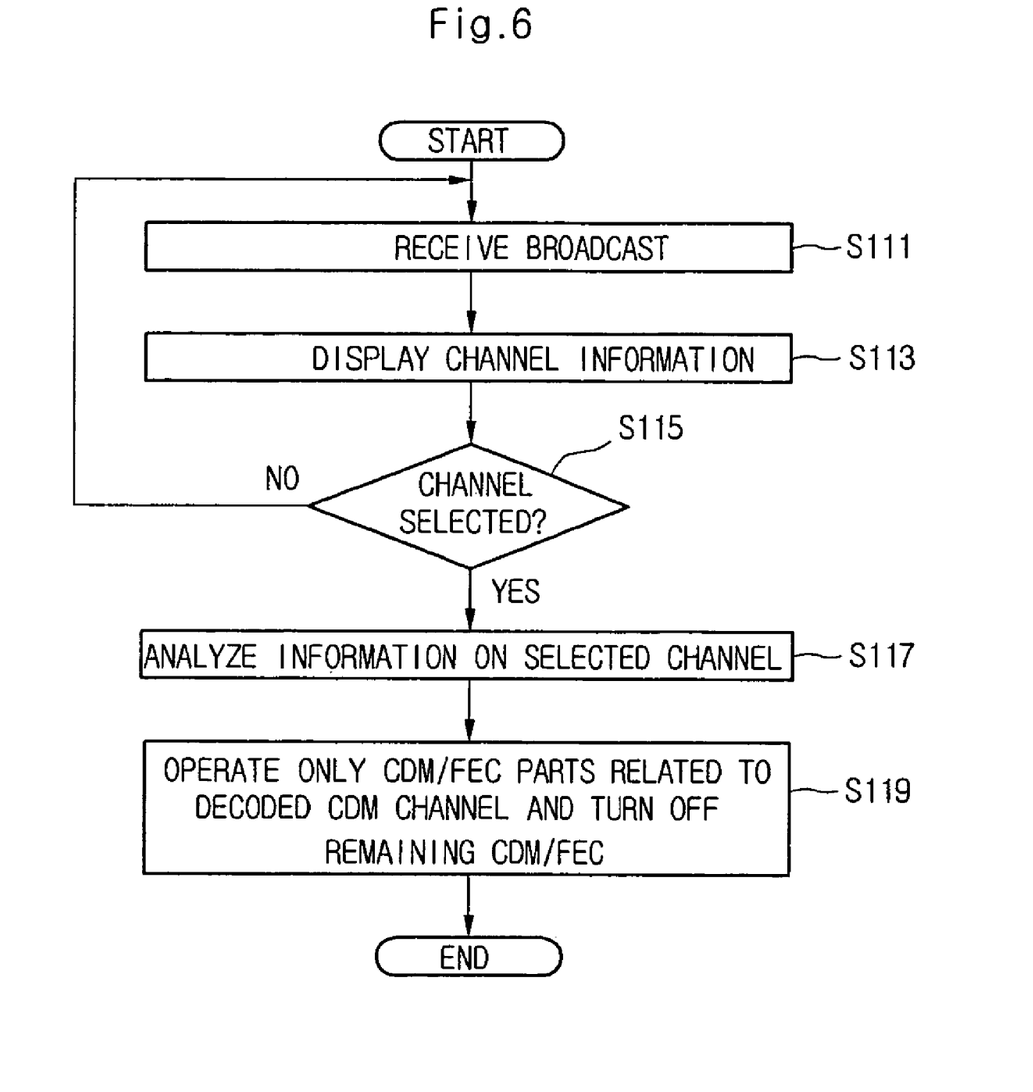
FIG. 6 is a flow diagram illustrating a power control method for a DMB receiver according to another embodiment of the present invention.

FIG. 6 is a flow diagram illustrating a power control method for a DMB receiver according to another embodiment of the present invention.

Referring to FIG. 6, the DMB receiver receives a broadcast signal (S111) and display channel information for view by a user (S113). At this time, the DMB receiver identifies whether or not a specific DMB channel is selected or converted by the user (S115). If a specific channel is selected or converted, the DMB receiver analyzes information on the selected channel (S117) to thereby identify whether or not a Walsh code is assigned to the selected CDM channel. If a Walsh code is assigned, the DMB receiver supplies a clock signal only to CDM/FEC parts related to the selected CDM channel and turns off the remaining CDM/FEC parts (S119).

That is, the DMB receiver analyzes whether the selected CDM channel is a video program channel or an audio program channel, whether or not the selected channel needs subscriber authentication, and whether or not an EPG channel is being received, and then operates only CDM/FEC parts related to the CDM channel and turns off the remaining CDM/FEC parts according to the analysis results.

In this manner, only necessary CDM/FEC parts are operated when a broadcast program is received, whereby the total power consumption of the DMB receiver can be reduced.

As described previously, the power control device and method for the DMB receiver according to the present invention has the following effects.

Firstly, Input clock signals of the CDM/FEC parts are controlled, whereby the power consumption of the modem part can be reduced up to ⅘ in comparison to the prior art.

Secondly, when a broadcast program is not received, the DMB receiver can be stood by for an emergency/disaster broadcast at minimum power by using the pilot channel.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A power control device for a DMB (multimedia broadcasting) receiver, for receiving a multiplexed broadcast signal transmitted from a DMB, the device comprising:
    N CDM/FEC (code division multiplexing/forward error correction) parts for demodulating the received broadcast signal into up to N CDM channel signals and error-correcting the demodulated up to N CDM channel signals in order to generate at least one of a pilot payload signal or a transport stream;
    a plurality of clock switches for controlling clock signals supplied to the N CDM/FEC parts configured to selectively control an operation of the demodulated channel of the N CDM/FEC parts;
    a clock switch controller for controlling the plurality of clock switches; and
    a CPU (central processing unit) for controlling the clock switch controller to operate the N CDM/FEC parts to interface with at least one of a broadcast channel comprising channel information or a broadcast channel selected by a user, wherein the channel information of the CDM/FEC parts is determined by the existence of a predetermined code wherein the N CDM/FEC parts are configured to demodulate the received broadcast signal into up to N CDM channel signals.

2. The device according to claim 1, wherein the clock switch controller turns on clock switches of CDM/FEC parts related to a pilot channel and turns off clock switches of remaining CDM/FEC parts according to whether or not a broadcast program is received.

3. The device according to claim 1, wherein the clock switch controller controls switches of related CDM/FEC parts according to subscriber authentication or non-authentication of the broadcast program.

4. The device according to claim 1, wherein the clock switch controller controls switches of related CDM/FEC parts according to whether or not an EPG (electronic program guide) channel is received in the broadcast program.

5. The device according to claim 1, wherein the clock switch controller controls switches of CDM/FEC parts related to reception of video/audio channels according to whether or not the broadcast program is a video program.

6. The device according to claim 1, wherein the clock switch controller controls switches of CDM/FEC parts related to reception of an audio channel according to whether or not the broadcast program is an audio program.

7. The device according to claim 1, wherein the CPU controls the clock switch controller so that the clock signals are supplied to CDM/FEC parts related to CDM channels received by the broadcast program and the selected broadcast channel, and supply of the clock signals to remaining CDM/FEC is cut off.

8. The device according to claim 7, wherein the CPU controls the supply of the clock signals to the CDM/FEC parts by using a Walsh code containing CDM channel information.

9. The device according to claim 1, wherein the clock switches are 2N numbered and is controlled by N clock control signals outputted from the clock switch controller.

10. The device according to claim 1, wherein the clock switches are N numbered and is controlled by N clock control signals outputted from the clock switch controller.

11. A power control device for a broadcasting receiver, the device comprising:
    a tuner for receiving a broadcast signal;
    a modem part comprising predetermined N CDM/FEC (code division multiplexing/forward error correction) parts for demodulating the received broadcast signal into the predetermined N or less CDM channel signals and error-correcting the demodulated predetermined N or less CDM channel signals in order to generate at least one of a pilot payload signal or a transport stream;
    a decoder for decoding at least one of the generated pilot payload signal or transport stream;
    a plurality of clock switches for controlling clock signals supplied to the N CDM/FEC parts configured to selectively control an operation of the demodulated channel of the N CDM/FEC parts; and
    a clock switch controller controlled by a CPU, wherein the clock switch controller controls the N CDM/FEC parts by controlling the plurality of clock switches according to at least one of a broadcast channel comprising channel information or a broadcast channel selected by a user to selectively operate at least on the N CDM/FEC parts, wherein the N CDM/FEC parts are configured to demodulate the received broadcast signal into up to N CDM channel signals.

12. The device according to claim 11, wherein the N CDM/FEC parts comprise minimally 5 CDM/FEC parts.

13. A power control method for a multimedia broadcasting receiver, the method comprising:
    receiving a broadcast signal when the receiver is powered on;
    demodulating the received broadcast signal into CDM channel signals and error-correcting the demodulated CDM channel signals in order to generate a pilot payload signal and a transport stream and then decoding the pilot payload signal; and
    turning off supply of clock signals to CDM/FEC (code division multiplexing/forward error correction) parts not related to at least one of a broadcast channel comprising channel information or a broadcast channel selected by a user, wherein the CDM/FEC parts are configured to demodulate the received broadcast signal into up to N CDM channel signals.

14. The method according to claim 13, wherein supply of the clock signals to the CDM/FEC parts is controlled according to whether or not a broadcast program is received, whether or not an EPG (electronic program guide) channel is received, whether or not subscriber authentication is performed, and whether or not video/audio programs are received.

15. The method according to claim 14, wherein the supply of the clock signals to the CDM/FEC parts is turned on/off by turning on/off respective clock switch thereof.

16. The method according to claim 13, further comprising the steps of:
- displaying channel information when a broadcast signal is received;
- identifying whether or not a broadcast channel is selected by a user from the displayed channel information; and
- if a broadcast channel is selected, supplying clock signals to CDM/FEC parts related to CDM channels so as to receive the selected broadcast channel and cutting off supply of the clock signals to remaining CDM/FEC parts.

17. The method according to claim 16, wherein the clock signals of the CDM/FEC parts related to the CDM channels are respectively and simultaneously controlled according to whether or not subscriber authentication of a video or audio program is preformed and whether or not an EPG channel is received.

18. A power control device for a receiver, the device comprising:
- at least one CDM/FEC (code division multiplexing/forward error correction) part for demodulating a received broadcast signal into at least one CDM channel signal, and error-correcting the demodulated channel signal in order to generate at least one of a pilot signal or a transport stream;
- at least one clock switch for controlling clock signals supplied to the at least one CDM/FEC part;
- a clock switch controller for controlling the clock switches configured to selectively control an operation of the demodulated channel of the CDM/FEC parts; and
- a CPU (central processing unit) for controlling the clock switch controller to selectively operate the CDM/FEC parts according to at least one broadcast channel comprising channel information, wherein the CDM/FEC parts are configured to demodulate the received broadcast signal into up to N CDM channel signals.

19. A power control device for a receiver, the device comprising:
- at least one a device for demodulating a received broadcast signal into at least one CDM channel signal, and error-correcting the demodulated at least one channel signals in order to generate at least one of a pilot signal or a transport stream;
- at least one clock switch for controlling clock signals supplied to at least the device;
- a clock switch controller for controlling the at least one clock switch configured to selectively control an operation of the demodulated channel of at least one channel signal; and
- a CPU (central processing unit) for controlling the clock switch controller according to at least one of a broadcast channel comprising channel information or a broadcast channel selected by a user in order to selectively operate the at least one the device, wherein the at least one device is configured to demodulate the received broadcast signal into up to N CDM channel signals.

* * * * *